United States Patent [19]

Tamaru

Best Available Copy

[11] E Re. 30,852

[45] Reissued Jan. 19, 1982

[54] ELECTRONIC TIMEPIECE

[75] Inventor: Munetaka Tamaru, Tokyo, Japan

[73] Assignee: Citizen Watch Co., Inc., Tokyo, Japan

[21] Appl. No.: 227,989

[22] Filed: Jan. 23, 1981

Related U.S. Patent Documents

Reissue of:

[64] Patent No.: 4,212,158
Issued: Jul. 15, 1980
Appl. No.: 947,151
Filed: Sep. 29, 1978

[30] Foreign Application Priority Data

Sep. 30, 1977 [JP] Japan ..... 52-118092

[51] Int. Cl.[3] ..... G04C 3/00; G04B 27/00

[52] U.S. Cl. ..... 368/80; 368/185

[58] Field of Search ..... 368/66, 76, 80, 85, 368/185–187, 217, 220, 223, 224, 228

[56] References Cited

U.S. PATENT DOCUMENTS 3,949,545 4/1976 Chihara ..... 368/66
3,998,043 12/1976 Tamaru et al. ..... 368/80 X
4,014,164 3/1977 Fujita ..... 368/628 X
4,041,691 8/1977 Chihara et al. ..... 368/66
4,129,981 12/1978 Nomura et al. ..... 368/204
4,150,536 4/1979 Narajima et al. ..... 368/185 X

*Primary Examiner*—Vit W. Miska
*Attorney, Agent, or Firm*—Birch, Stewart, Kolasch & Birch

[57] ABSTRACT

An electronic timepiece having an intermittent driving means for rotating the second hand step by step, in which the second hand may be driven in two or more ways, one of by a large step as driving the second hand at the rate of one step per second and the other is by a small step such as driving the second hand at the rate of ten steps per second. There is provided a large step driving pulse producing circuit, a small step driving pulse producing circuit, a transducer for transducing the pulse into the rotating motion, a large step transmitting means, a small step transmitting means, a train for transmitting the rotating motion to the second hand, and means for changing the pulses applied to the transducer and for changing the transmitting means.

7 Claims, 8 Drawing Figures

ELECTRONIC TIMEPIECE

Matter enclosed in heavy brackets [ ] appears in the original patent but forms no part of this reissue specification; matter printed in italics indicates the additions made by reissue.

BACKGROUND OF THE INVENTION

The present invention relates to an electronic timepiece having an intermittent driving means for rotating the second hand step by step.

In the electronic timepiece, an intermittent driving means such as a step or pulse motor is preferably employed because such a motor may be operated with a small power consumption and may securely drive the second hand against the shock given thereto, although it is desirable to drive the second hand continuously to indicate the flow of time. In such an intermittent drive electronic timepiece, the second hand is driven at the rate of one step per second. However, in order to set precisely the second hand to less than a time or to read an error of the second at a time, the timepiece must be constructed to indicate the time in an order below a second such as the order of 1/10 second.

SUMMARY OF THE INVENTION

It is an object of the present invention to provide an electronic timepiece in which the second hand may be driven with a step smaller than that of a second to indicate the time with greater accuracy than second steps will give.

Another object of the present invention is to provide an electronic timepiece in which the use of a large step of the second hand such as one step per second and the use of a small step such as ten steps per second may be selectively changed.

In accordance with the present invention there is provided an electronic timepiece comprising a large step driving pulse producting circuit, a small step driving pulse producing circuit, means for transducing said driving pulse into the rotating motion, means for changing said driving pulses to be applied to said means for transducing, means for transmitting the rotating motion by said large step driving pulse, means for transmitting the rotating motion by said small step driving pulse, means for changing said means for transmitting the rotating motion, a train for transmitting said rotating motion to second, minute and hour hands, and means for manipulating said means for changing said driving pulses and means for changing said means for transmitting the rotating motion.

Figure 1:
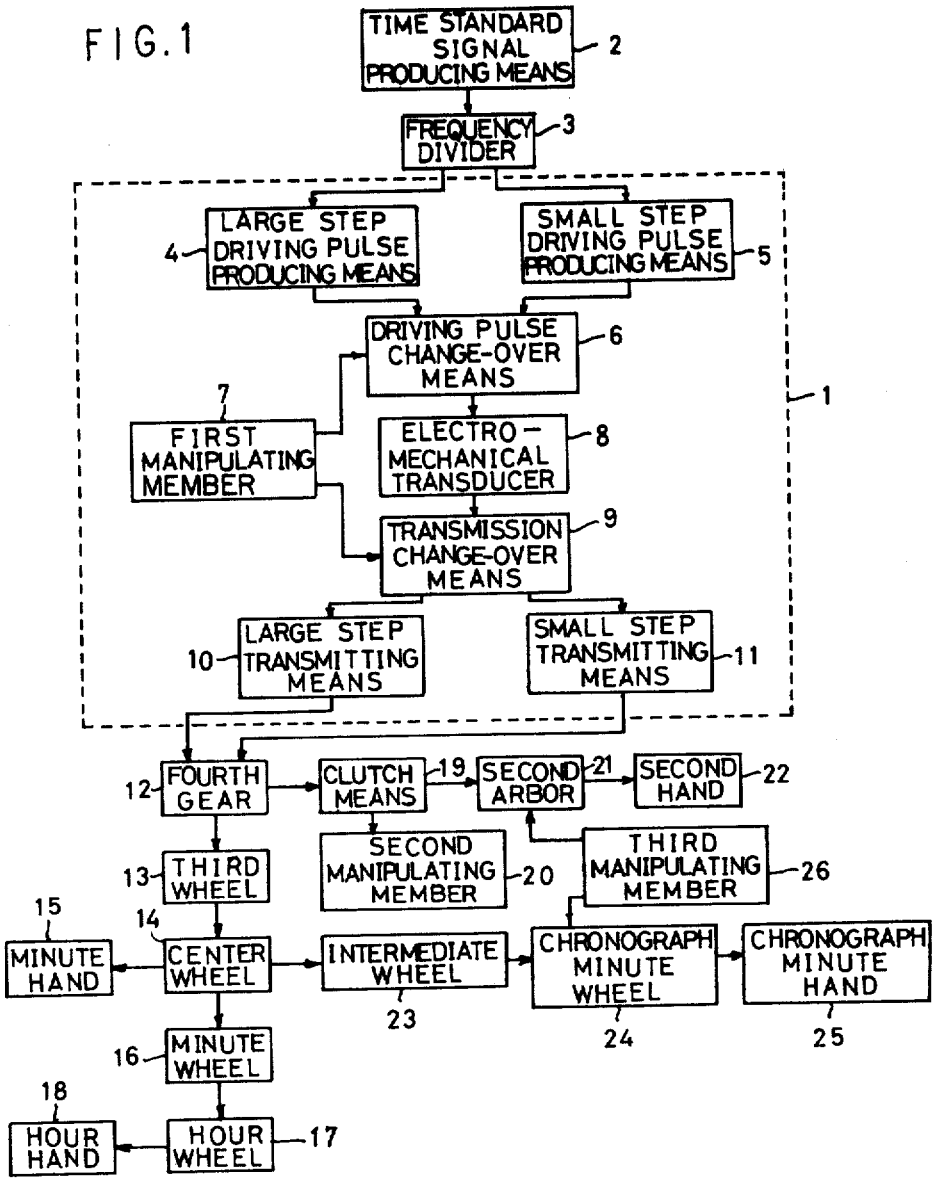
FIG. 1 is a block diagram showing an embodiment of the present invention.
Figure 2:
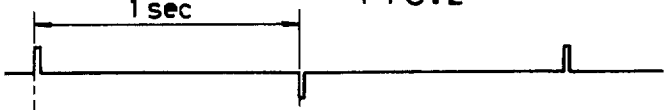
FIG. 2 is a waveform of a pulse for large step driving.
Figure 3:
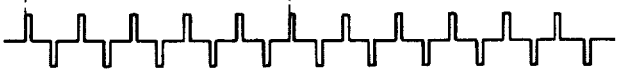
FIG. 3 is a waveform of a pulse for small step driving.

Referring now to the drawings and more particularly to FIG. 1, numeral 1 generally designates a main portion of the present invention. Numeral 2 is a time standard signal producing means in the form of a quartz crystal oscilator of which time standard signal is divided by the frequency divider 3 to a predetermined frequency. The main portion 1 comprises a large step driving pulse producing means 4, a small step driving pulse producing means 5, a driving pulse change-over means 6, a first manipulating member 7, an electro-mechanical transducer 8, a transmission change-over means 9, a large step transmitting means 10, and a small step transmitting means 11. The large step driving pulse producing means 4 produces an alternating pulse of 1 Hz as shown in FIG. 2 and s small step driving pulse producing means 5 produces an alternating pulse of 10 Hz as shown in FIG. 3. The driving pulse change-over means 6 is actuated by the first manipulating member 7 to select the pulse for driving the electro-mechanical transducer 8. The transmission change-over means 9 is also operated by the first manipulating member 7 to select the transmitting means. The large step transmitting means 10 is constructed to transmit the output power of the transducer 8 to the train to drive the second hand (hereinafter described) at the rate of one step per second and the small step transmitting means 11 is constructed to transmit the output power of the transducer 8 to the train to drive the second hand at the rate of ten steps per second.

The train comprises a fourth gear 12, a third wheel 13, a center wheel 14 mounting a minute hand 15, a minute wheel 16, and an hour wheel 17 carrying an hour hand 18, as usual watch.

In this embodiment, a mechanism for a chronograph is provided. The mechanism comprises a clutch means 19, a second manipulating member 20, a second arbor 21 carrying a second hand 22 also serving as a chronograph second hand, an intermediate wheel 23, and a chronograph minute wheel 24 carrying a chronograph minute hand 25. The clutch means 19 is actuated by the second manipulating member 20 to transmit the rotation of the fourth gear 12 to the second arbor 21. The intermediate wheel 23 acts to transmit the rotation of the center wheel 14 to the chronograph minute wheel 24 and has a slip mechanism which acts to slip when the chronograph minute hand 25 is returned to zero. The chronograph minute wheel 24 has a heart cam mechanism not shown which is actuated by a third manipulating member 26 to return the chronograph minute hand to zero. As hereinafter described in detail, the second arbor 21 has a heart cam mechanism.

Figure 4:
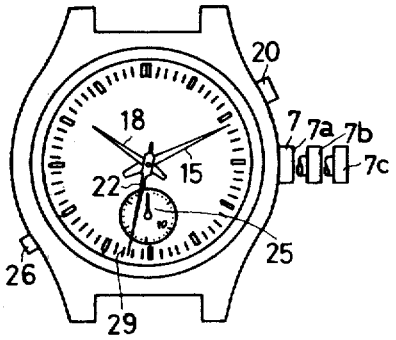
FIG. 4 is a front view of a watch according to the present invention.

Referring to FIG. 4, the watch according to the embodiment has the chronograph minute hand 25, the common second hand 22, the ordinary hour hand 18 and minute hand 15. The first manipulating member 7 may be shifted to three axial positions 7a, 7b, and 7c. In the innermost position of 7a, the second hand 22 rotates one step per second which is represented by a distance between the indexes 29. The second hand 22 rotates ten steps per second in the intermediate position 7b. When the member 7 is pulled to the outermost position 7c, the second hand 22 stops and the hour hand 18 and minute hand 15 may be rotated by manipulating the member 7 to correct the time display with the well known mechanism. The second manipulating member 20 is manually depressible and means is provided for alternatively rotating and stopping the second hand 22 and minute hand 25 at every depression of the member 20 as will be described hereinafter. The second hand 22 and minute hand 25 may be returned to zero by depressing the third manipulating member 26.

Figure 5:
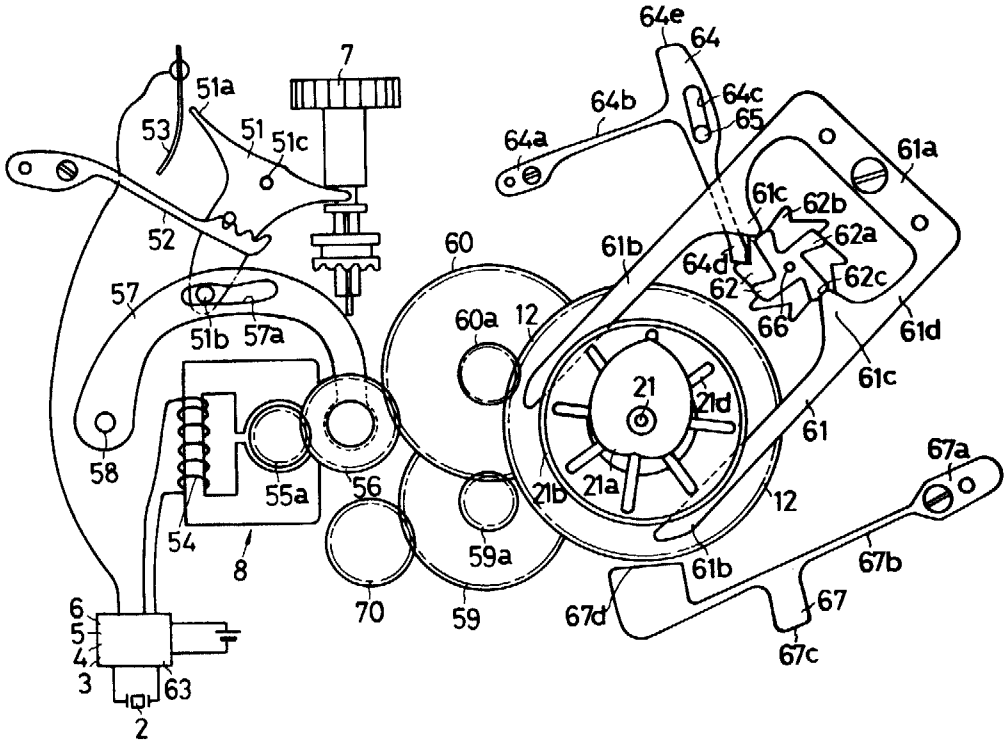
FIGS. 5 and 6 are plan views showing a main portion of the watch.

Referring to FIG. 5 which shows an ordinary operating state of the watch, the first manipulating member 7 is held in the innermost position 7a by engagement of the well known setting lever 51 with setting lever spring 52. The divider 3, large and small step driving pulse producing means 4 and 5, and driving pulse change-over means 6 are constructed into an integrated circuit 63. A resilient switch blade 53 is provided to be insulated and connected to the driving pulse change-over means 6. The resilient switch blade is positioned adjacent the end portion 51a of the setting lever 51. The driving pulse change-over means 6 is so arranged that, when the end portion 51a contacts with the switch blade 53, the driving pulse such as 10 Hz pulse shown in FIG. 3, which is produced in the small step driving pulse generator 5, is applied to the driving coil 54 of the electro-mechanical transducer 8, and when the end portion 51a removes from the switch blade 53, the driving pulse such as 1 Hz pulse shown in FIG. 2, which is produced in the large step driving pulse generator 4, is applied thereto.

Figure 7:
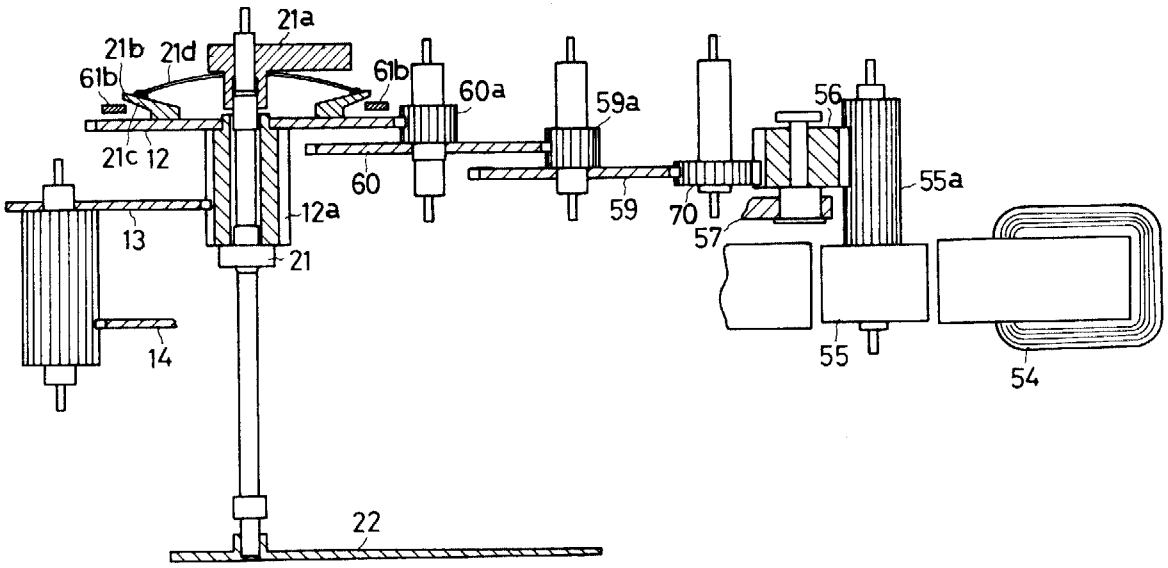
FIG. 7 is a sectional view showing the train of the watch.

The electro-mechanical transducer 8 such as pulse motor comprises a rotor 55 (FIG. 7) of permanent magnet and a pinion 55a integral with the rotor. The pinion 55a has ten teeth and engages with a change gear 56 having twelve teeth. The change gear 56 is pivotally mounted on a change lever 57 which is adapted to be rocked about a pin 58 by actuation of the setting lever 51 with the cooperation of the pin 51b on the setting lever with the cam groove 57a of the change lever 57. A sixth wheel 59 engaging with an intermediate gear 70 constitutes a part of the small step transmitting means 11 and has sixty teeth. The sixth wheel is integral with a sixth wheel pinion 59a having six teeth which engages with a fifth wheel 60. The fifth wheel 60 constituting a part of the large step transmitting means 10 has sixty teeth and is integral with a fifth wheel pinion 60a having ten teeth. The fifth wheel pinion 60a engages with the fourth gear 12 having fifty teeth which is integral with a fourth pinion 12a as shown in FIG. 7. The fourth pinion 12a is rotatably mounted on the second arbor 21 which is rotatably supported by not shown bearings. Secured to the second arbor 21 is a heart cam 21a to which a star shaped spring washer 21d forming a part of the clutch means 19 is secured. The outer ends of legs of the washer are secured to an engaging ring 21b which is slidably provided on the fourth gear 12. The spring washer 21d urges the engaging ring 21b toward the fourth gear 12 transmit the rotation of the fourth gear to the second arbor 21.

U-shaped disengaging lever 61 is secured to a not shown base plate at the base portion 61a as shown in FIG. 5. The disengaging lever has a pair of arms 61b extending to radially opposite sides of the engaging ring 21b and a pair of projections 61c located at the radially opposite sides of an indexing wheel 62. The indexing wheel 62 is pivotally mounted on the base plate with a shaft 66 and comprises a cam plate 62c engaging with the projections 61c and a ratchet 62b engaging with an indexing end 64d of a starting lever 64. The starting lever 64 is secured to the base plate at an end 64a and has a resilient portion 64b, a slot 64c engaging with a pin 65 secured to the base plate and an end 64e engaging with the inner end of the second manipulating member 20 (shown in FIG. 4). Depressing the second manipulating member 20, the end 64d indexes the ratchet 62b and cam plate 62a one step. When the finger of the operator removes from the member 20, the starting lever 64 returns to the position of FIG. 5 where the lower end of the slot 64c engages with the pin 65. It will be seen that the end 64d acts also as a locating member for the ratchet 62b, which is advantageous to the manufacture of the mechanism within a small space with a small number of parts.

When each of the projections 61c of the disengaging lever 61 engages with the top 62c of the cam plate 62a of the indexing wheel 62 as shown in FIG. 5, arms 61b are removed from the engaging ring 21b as shown in FIG. 7. When the projection 61c removes from the top 62c as shown in FIG. 6, arms 61b are biased to the engaging ring 21b by the resilient force in the portions 61d, so that the arms engage with tapered surface 21c of the engaging ring to take off the ring from the fourth gear 12 resulting in the stop of rotation of the second arbor 21.

A hammer 67 secured to the base plate at an end 67a comprises a resilient portion 67b, a projection 67c engaging with the end of the third manipulating member 26 (shown in FIG. 4), and an actuating slant 67d. When the third manipulating member 26 is depressed, the hammer 67 is biased so that the actuating slant 67d engages with the heart cam 21 to rotate it and hence to return the second hand to zero.

In operation, assume that the first manipulating member 7 is positioned in the innermost position 7a in FIG. 4. With reference to FIG. 5, 1 Hz driving pulse is applied to the coil 54, so that the pinion 55a rotates one full turn at the rate of two steps per 2 second. The rotational speed of the pinion 55a is reduced by the train comprising the gear 56, fifth wheel 60 and fifth wheel pinion 60a to rotate the fourth wheel 12 at the rate of 60 step per minute. At this time, the sixth wheel pinion 59a and sixth wheel 59 idle. Rotation of the fourth wheel 12 is transmitted to the second arbor 21 and second hand 22 through the engaging ring 21b, spring washer 21d and heart cam 21a, so that the second hand rotates at the rate of one step per second.

Figure 6:
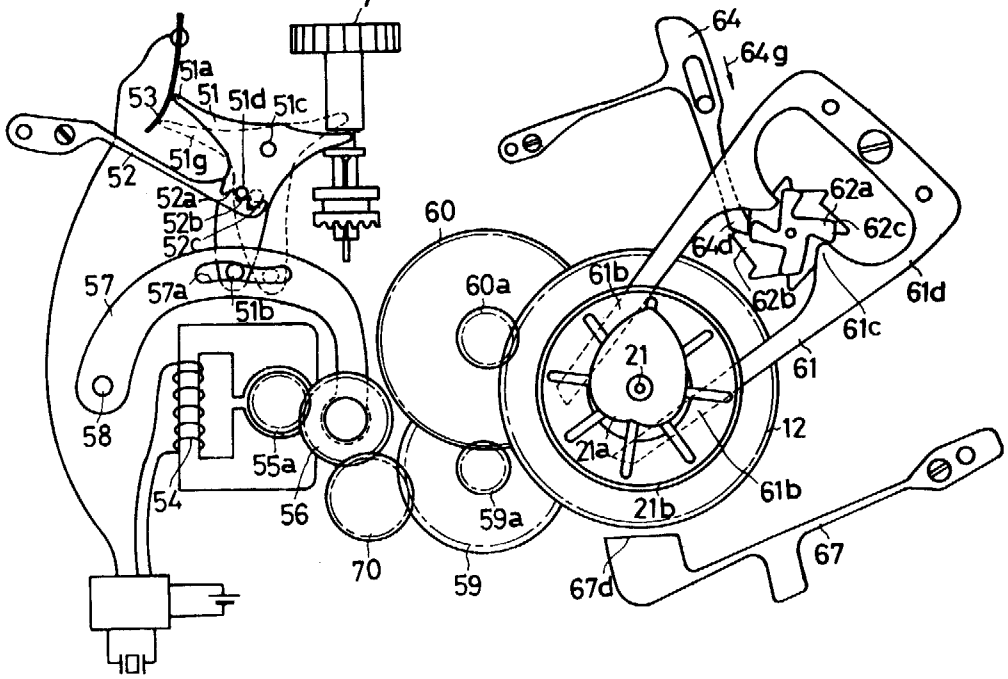

Pulling out the first manipulating member 7 to the intermediate position 7b of FIG. 4, the setting lever 51 is counterclockwisely rotated about the pin 51c, and the pin 51d is moved from the notch 52a of the setting lever spring 52 to the notch 52b as shown in FIG. 6. Rotation of the setting lever causes the change lever 57 to rotate clockwisely about the pin 58 to disengage the change gear 56 from the fifth wheel 60 to engage it with the gear 70. The end 51a of the setting lever 51 engages with the switch blade 53 to apply the signal to the driving pulse change-over means 6, whereby 10 Hz pulse is applied to the coil 54. Thus, the pinion 55a rotates at the rate of 2 steps per 0.2 second. Rotation of the pinion 55a is transmitted to the fourth gear 12 via the train comprising the gears 56, 70 sixth wheel 59, sixth wheel pinion 59a, fifth wheel 60 and fifth wheel pinion 60a, so that the second hand 22 may be rotated at the rate of ten steps per second.

Pulling out the first manipulating lever 7 to the outermost position 7c (FIG. 4), the setting lever 51 is rotated to the dotted line position 51g of which rotation does not effect the rotation of the change lever 57 because the cam groove 57a of the region has a circular cam face with the pin 51c for its center. Supply of the pulse to the coil 54 is cut off by operation of a switch (not shown) and the second hand 22 is stopped by operation of a brake mechanism (not shown), of which detailed explanation is omitted since the mechanism is well known. Under this condition, the hour hand 18 and minute hand 15 may be rotated to rotating the first manipulating member 7 for the correction of the time display.

Now describing the chronograph operation, two kinds of chronograph operations may be performed in the illustrated watch, one of which is carried out with the large step driving pulse and the other is carried out with the small step driving pulse. Since both operations are similar to each other, the latter case will be described hereinafter. As mentioned above, when the first manipulating member 7 is located in the intermediate position 7b, the change gear 56 engages with the sixth wheel 59 as shown in FIG. 6 and the second arbor 21 is rotated at the rate of 600 steps per minute. Depressing the second manipulating member 20, the starting lever 64 is biased in the direction of the arrow 64g to rotate the ratchet 62b and cam plate 62a one step in the counterclockwise direction. Thus, projection 61c removes from the top 62c of the cam plate, so that the arms 61b engage with the tapered portion 21c of the engaging ring 21b resulting in removal of the engaging ring from the fourth gear 12. Accordingly, the second arbor 21 and second hand 22 step upon the depression of the second manipulating member 20. Thereafter, when the third manipulating member 26 is depressed, the slant 67d of the hammer 67 engages with the heart cam 21a to rotate it together with the second hand 22 to the zero position with sliding the tapered portion 21c of the engaging ring 21b on the side of each arm 61b.

Depressing again the second manipulating member 20, the starting lever 64 acts to rotate the ratchet 62b and cam plate 62a one step, resulting in the engagement of the projection 61c with the top 62c of the cam plate 62a. Thus, the arms 61b removes from the engaging ring 21c to engage the ring with the fourth gear 12 to rotate the second hand. The minute wheel 24 may be returned to zero by not shown mechanism similar to the above described mechanism by depressing the third manipulating member 26.

While a single embodiment of the present invention has been illustrated and described, it will be apparent to those skilled in the art that numerous variations and modifications may be made. For example, change of the steps of the second hand may be performed other mechanism than the axially moved manipulating member 7 as rotational mechanism, the change gear may be axially moved to change the engagement with axially arranged fifth and sixth wheels and three or more kinds of driving step may be employed to drive the second hand. It is preferable to design the driving pulse change-over means 6 to have time delay corresponding to the changing operation of the change lever 57 and change gear 56. The intermediate gear 70 may be omitted, if an electro-mechanical transducer is so arranged that the rotor 55 may be reversely rotated by a small step driving pulse.

Figure 8:
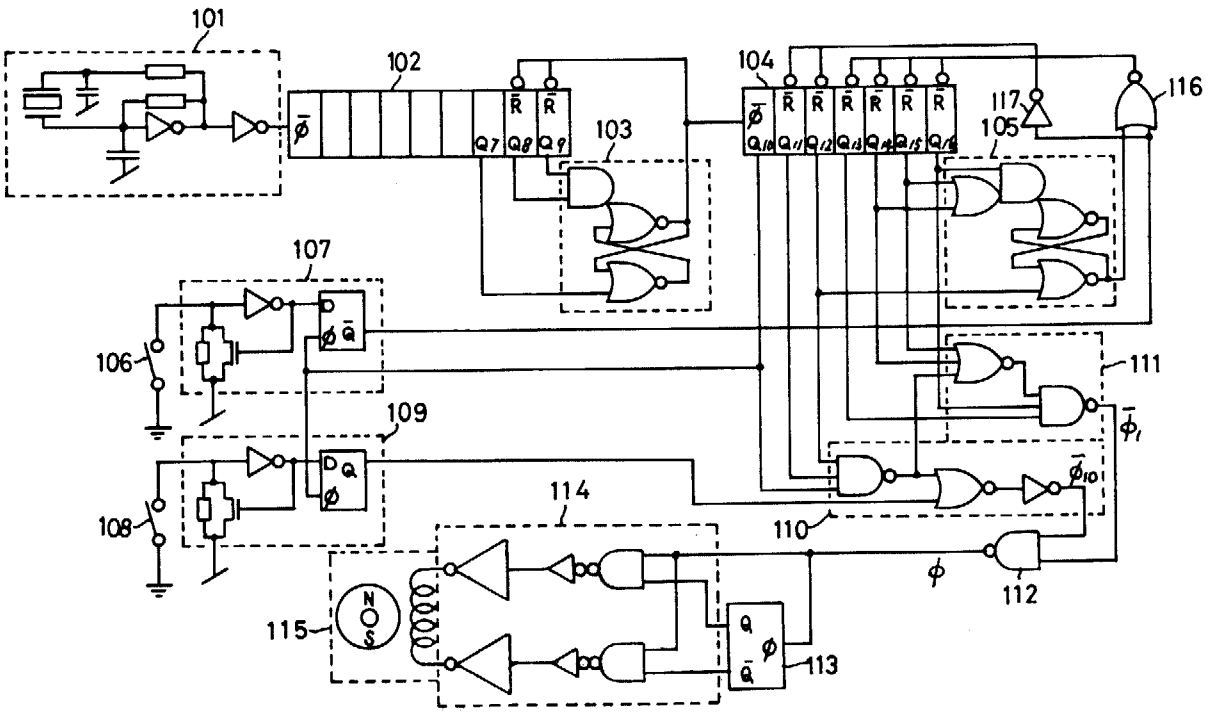
FIG. 8 is a block diagram of means for generating driving pulses.

Referring to FIG. 8 showing an example of means for generating large step and small step driving pulses and means for changing the driving pulses, numeral 101 designates a quartz crystal oscilator producing the time standard signal of 30720 Hz which may be advantageously divided into 10 Hz and 1 Hz pulse signals. The time standard signal is applied to a frequency divider 102, which includes a gate circuit 103 having $\frac{1}{3}$ divisional rate. The gate circuit 103 produces 80 Hz pulse signal by dividing the output of seventh flip-flop Q7 by 3. The 80 Hz pulse signal is applied to a second frequency divider 104 including a gate circuit 105. The gate circuit has 1/10 divisional rate and hence the second frequency divider 104 has $2^{-3}\times10^{-1}$ divisional rate. Thus, the flip-flop Q12 produces 10 Hz pulse signal for the small step driving and the gate circuit produces 1 Hz pulse signal for the large step driving. Numeral 106 is a reset switch, 108 is a change-over switch for large and small steps, 107 is a reset signal generating circuit comprising a guard circuit for opening operation of the switch 106, and a date-input flip-flop for reading the state of the switch using 40 Hz signal from the flip-flop Q10 of the frequency divider 104 for clock pulse. The guard circuit comprises a pullup resistor, an invester and a transistor 109 is a change-over signal generating circuit having similar construction as the circuit 107.

Numeral 110 is a gate circuit for producing the small step driving pulse $\phi$10 of 10 Hz. When the first manipulating member 7 is pulled out to the intermediate position 7a (FIG. 4), the switch 108 corresponding the driving pulse change-over means 6 is closed and the output of the change-over signal generating circuit 109. is zero. Accordingly, the output pulse is $$\phi 10 = Q_{10}\cdot Q_{11}\cdot Q_{12}$$

which means that negative pulse of 10 Hz having the width of 1/80 second is produced by the gate circuit 110. 111 is a gate circuit for producing the large step driving pulse $\phi$1. The pulse is $$\phi 1 = Q_{10}\cdot Q_{11}\cdot Q_{12}\cdot Q_{13}\cdot Q_{14}\cdot Q_{15}\cdot Q_{16}.$$

That is the negative pulse of 1 Hz having the width of 1/80 second is produced. Both pulses $\phi$10 and $\phi$1 are combined by an AND gate 112 to produce a signal $\phi$. The signal $\phi$ acts to trigger a toggle flip-flop 113. The signal $\phi$ and output Q and Q of the flip-flop 113 are applied to a driving circuit 114, which in turn produces alternative output pulse to drive the pulse motor 115 corresponding the electro-mechanical transducer 8. The reset signal from the reset signal generating circuit 107 is applied to the second frequency divider 104 through the gate 116 and inverter 117 to change the output of Q11–Q16 to zero.

From the foregoing it will be understood that the present invention provides an electronic timepiece in which second hand may be driven step by step with a small step on demand, whereby it is possible to set precisely the second hand to the time and to read accurately the time.

What is claimed is:

1. An electronic timepiece comprising: display means having a plurality of hands for displaying time;

first means for producing a first pulse train of a first predetermined frequency;

second means for producing a second pulse train of a second predetermined frequency less than said first predetermined frequency;

switch means for selecting one of said first or second pulse trains and providing the selected pulse train at its output;

an electro-mechanical transducer for converting said selected pulse train into rotary motion;

transmission means for transmitting the rotary motion of said electro-mechanical transducer to said hands of said display means, said transmission means having first and second drive ratios; and means for changing said drive ratio of said transmission means in response to the change in said selected pulse train by said switch means.

2. The electric timepiece of claim 1;

wherein said first means includes a quartz oscillator for producing a high frequency time standard signal, and first divider means for reducing the frequency produced by said quartz oscillator to said first predetermined frequency;

and wherein said second means includes second divider means for reducing said first predetermined frequency to said second predetermined frequency.

3. The electronic timepiece of claim 5 wherein said display means includes:

an hour hand;

a minute hand; and a second hand.

4. The electronic timepiece of claim 3 further comprising:

clutch means connected between said transmission means and said second hand to disconnect said second hand from said transmission means;

means for controlling the engagement of said clutch means to selectively disconnect said second hand from said transmission means in response to user command; and means for resetting said second hand in response to a user command.

5. The electronic timepiece of claim 4 wherein said second hand is used as both an actual time second hand and as an elapsed time second hand;

wherein said means for resetting is actuated to reset said second hand after said clutch means is disengaged by said means for controlling, to disconnect said second hand from said transmitting means; and wherein said clutch means is engaged by said means for controlling after said second hand is reset to being the elapsed time function.

6. The electronic timepiece of claim 4 wherein said means for resetting includes a heart cam and a user activated hammer for rotating said heart cam to move said second hand to the zero position.

7. The electronic timepiece of claim 4 wherein said electro-mechanical transducer converts said selected pulse train into intermittent rotary motion.

* * * * *